A. B. FOWLER.
ROTARY CUTTER HEAD.
APPLICATION FILED JUNE 16, 1919.
1,407,021.
Patented Feb. 21, 1922.
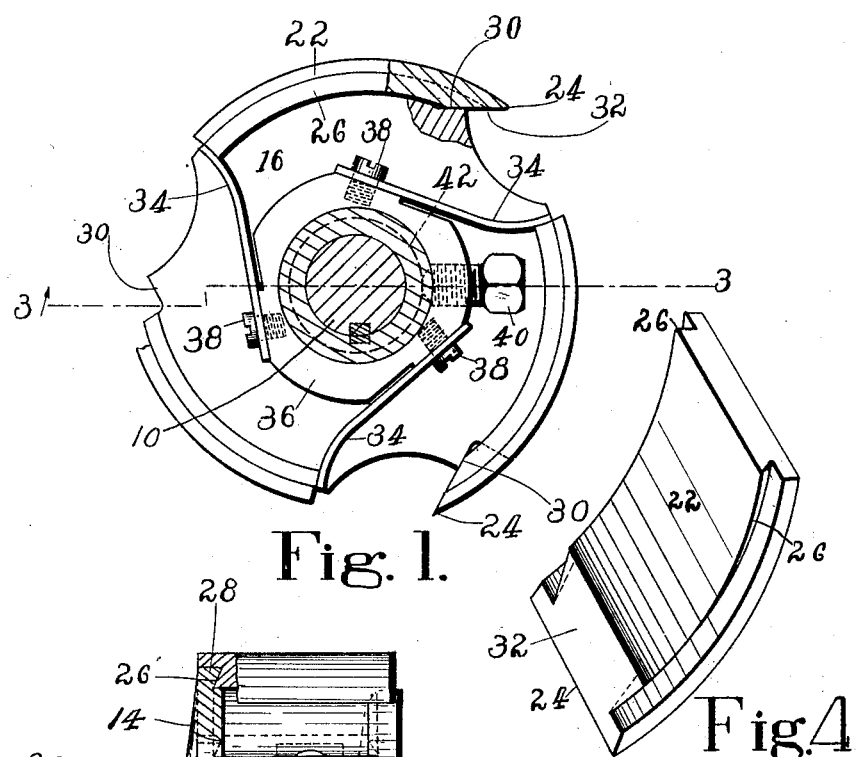
Fig. 1.
Fig. 4.
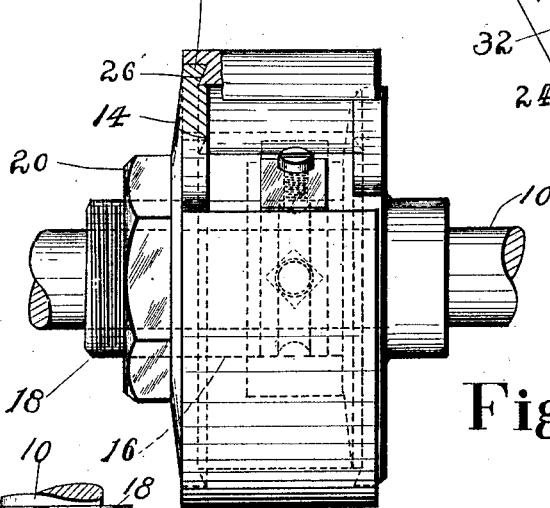
Fig. 2.
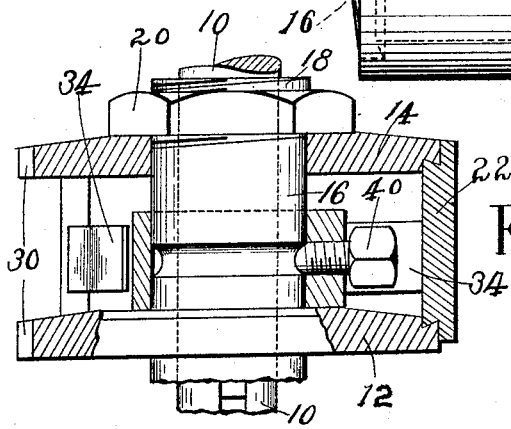
Fig. 3.
INVENTOR
Alfred B. Fowler
By his Attorney
Nelson M. Howard

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

ROTARY CUTTER HEAD.

1,407,021. Specification of Letters Patent. Patented Feb. 21, 1922.

Application filed June 16, 1919. Serial No. 304,598.

*To all whom it may concern:*

Be it known that I, ALFRED B. FOWLER, a citizen of the United States, residing at Beverly, in the county of Essex and State of Massachusetts, have invented certain Improvements in Rotary Cutter Heads, of which the following description, in connection with the accompanying drawings, is a specification, like reference characters on the drawings indicating like parts in the several figures.

This invention relates to rotary cutter-heads and more especially to those having a plurality of detachable and adjustable blades.

For the sake of economy rotary cutter-heads for many purposes are provided with a series of blades that may be detached for sharpening and replacement, but heretofore there has been difficulty in adjusting the blades so that their cutting edges will be equidistant from the axis of rotation. For some kinds of work it is especially important to have the cutting edges equidistant from the axis of rotation in order to obtain uniform depth of cut by all the blades. Furthermore it is desirable to locate the blades so as to balance the cutter-head, in order to avoid excessive vibration that would result from unequal distribution of weight.

In accordance with the first of the problems above stated one object of the present invention is to provide a rotary cutter-head having detachable and adjustable blades, and having means for determining the positions of the blades so that the cutting or shaving edges will be equidistant from the axis of rotation. Another object is to provide in such a cutter-head means for determining the location of the blades so that the head will be accurately balanced for rotation without undue vibration.

Preferably, and as herein shown, these results are obtained by a structure in which the means that serve to locate the blades are integral parts of the blade-clamping means. The illustrated embodiment of the invention comprises two cooperative clamping disks between and by which the blades are clamped, said disks having portions arranged to guide the blades for the purpose of adjustment lengthwise of the side edges of the blades, and having portions formed and arranged to limit the forward adjusting movement of the blades at positions where the latter, provided they are of uniform size and weight, will balance the head, and where the cutting edges will be equidistant from the axis of rotation.

A further object of the present invention is to provide an improved cutter-head in which all the blades may be clamped simultaneously by relative axial movement of the two disks, so that a single tightening element such as a nut will serve to fix all the blades in the position to which they have been adjusted. In cutter heads of this character as heretofore made it has been difficult to maintain all the blades in the desired positions while tightening the clamping elements, for the reason that one or more of the blades would slip out of position during the tightening operation. In view of this difficulty another object of the invention is to provide means for maintaining the blades in adjusted positions while they are being clamped. As shown, the head is provided with means by which the blades are automatically urged to the desired positions during the process of tightening the clamping elements.

Inasmuch as the blades grow shorter in consequence of being sharpened they would eventually become so short as to lose the benefit of the means by which they are urged to the desired positions of adjustment unless some provision is made to compensate for their decreasing length. Accordingly another object of the invention is to provide for this changing condition as to the length of the blades, to the end that said means may in every case exercise its function regardless of the shortening of the blades.

Other objects and features of the invention are hereinafter described and claimed and are illustrated by the accompanying drawings, in which—

Fig. 1 represents a cross-section of a cutter-head embodying a preferred form of the invention, Fig. 2 represents a side elevation partly in section of such cutter-head, Fig. 3 represents a section through the structure intersected by line 3—3 of Fig. 1, and Fig. 4 is a perspective view of one of the detachable cutting blades.

A rotary shaft carrying the cutter-head is indicated at 10. The cutter-head comprises two cooperative clamping disks 12 and 14, one of which, specifically that indicated at 12, having a hub 16. Disk 14 is provided with a central hole adapted to receive the hub 16 and is free to slide axially on the hub, although it is maintained in concentric relation by the hub. That end of the hub that projects through disk 14 is provided with an external screw thread 18 for cooperation with a nut 20 by which disk 14 may be forced toward disk 12 to clamp the blades.

In the present instance the cutter-head is formed to carry three cutting or shaving blades 22, although the number of blades would be optional. The cutting or shaving edges of the blades are indicated at 24 and the side edges, which are parallel to each other, are indicated at 26. As shown by Figs. 2 and 3, the side edges are undercut in dovetailed form, and the confronting faces of the clamping disks are provided with undercut portions 28 that constitute counterparts of the edges 26. When the blades and clamping disks are assembled in operative relation the edges 26 and portions 28 constitute cooperative tongue-and-groove connections by which the blades are locked positively against radial movement. These tongue-and-groove portions sustain the clamping stress when the nut 20 is tightened, so that they hold the blades frictionally against lengthwise movement while holding them positively against radial movement.

In the present instance the blades are of arcuate form and the clamping portions 28 of the disks are arranged to extend eccentrically with reference to the axis of rotation. It follows, therefore, that the distance from the axis to the cutting edges may be varied by adjusting the blades lengthwise.

In order to equalize the distance between the axis and the cutting edges, and at the same time to equalize the peripheral distance between the cutting edges, one or both clamping disks may be formed to provide stop portions arranged to limit the forward or outward adjusting movement of the blades. In the present instance each of the clamping disks is provided with portions 30 for this purpose so that the disks will act conjointly in limiting the forward adjusting movement. The blades are sharpened by grinding flat faces 32 on the inner side of the curve, and in practice these faces should be ground at uniform angles. Consequently, if the blades are uniform in respect to the angle of the ground faces 32, and if the stop faces 30 of the clamping disks are spaced equidistantly from the axis and from each other, the cutting edges 24 will always occupy positions of equidistance when the cutter-head is assembled so that the ground faces 32 bear against the stop faces 30 as shown.

A feature concerning the cost of manufacturing the clamping members 12 and 14 is that the stop faces 30 are disposed so that a series of them may be formed by one operation of a forming tool such as a milling cutter or a grinding wheel. For this operation a series of clamping members may be arranged in gang relation on an arbor and thereby presented to the forming tool.

The drawings include a device for urging the blades to their extreme forward positions of adjustment, but such device may be included or omitted as desired. It comprises a plurality of springs 34, one for each of the blades, and the springs act independently of each other so that the arresting of one of the blades by its stop face 30 will not effect the forward adjusting movement of any other blade. Each blade, therefore, will move forward under the influence of its respective positioning spring until it is arrested by its stop face 30, and when the clamping disks are subsequently forced toward each other the several cutting edges will be maintained by spring stress in positions of equidistance as determined by the stop faces.

According to the form of positioning device illustrated the springs 34 are leaf-springs and are carried by a collar 36 to which they are attached by screws 38. The collar is formed to fit upon the hub 16 and is provided with a set screw 40 to anchor it to the hub so that it will be, to all intents and purposes, an integral part of the cutter-head. The hub, as shown, is provided with a peripheral groove 42 and the inner end of the set screw 40 is formed to fit in said groove so as to hold the collar against axial movement even when the screw is loosened to permit rotative adjustment of the collar and springs. As the blades grow shorter in consequence of being sharpened the collar 36 may, whenever necessary, be advanced rotatively relatively to the hub to compensate for such shortening, and the collar will in each case be fastened at a position where the springs 34 will maintain a slight pressure against the rear ends of the blades when the ground faces 32 of the blades are seated on the stop faces 30.

The operation of assembling or taking apart the cutter-head may be performed readily and quickly. The only tool required is a wrench to turn the nut 20. To detach the blades requires merely unscrewing the nut far enough to release the tongue-and-groove portions of the blades and clamping disks, and the blades may be replaced by first placing their rear ends against the springs 34 and then forcing back the springs slightly to enable the ground faces 32 to lie behind the stop faces 30 when the undercut edges 26 are moved into registration with the undercut portions 28 of the disks. The conjoint action of the undercut portions and of the springs 34 serve to maintain the blades and disks in the desired relation while the nut 20 is being tightened.

It is to be noted that the clamping action by which the blades are held does not depend upon or utilize the shaft 10 upon which the head is usually mounted. Although the hub portion 16 is bored for the reception of the shaft so that the head may conveniently be keyed to the shaft, the head may be detached from the shaft without dismantling the parts comprised in the head and without slackening the clamping stress by which the said parts are held intact.

Having thus described my invention, what I claim as new and desire to secure by Letters Patent of the United States is:

1. A rotary cutter-head comprising a plurality of separate cutting blades, and two co-operative blade-supporting members arranged to clamp the blades, said supporting members and the blades having cooperative formations arranged to permit edgewise movement of the blades individually along lines such as to afford radial adjustment of the cutting edges relatively to the axis of the head but to prevent movement of the blades otherwise than as aforesaid, one or both of said blade-supporting members also having formations formed and arranged to act as stops to limit the outward adjusting movement of the blades so as to determine uniformly effective working positions of the latter.

2. A cutter-head embodying the construction defined by claim 1, in which said stop formations of the blade-supporting members are arranged to co-act with the ground faces of the blades by which the cutting edges are sharpened.

3. A cutter-head embodying the construction defined by claim 1, and characterized by tongue-and-groove formations on the blades and supporting members as the first said formations to control the relative movement of the blades as specified.

4. A cutter-head embodying the construction defined by claim 1, characterized by an arrangement of the first said formations such that the radial adjustment of the blades is restricted to a relatively small component of the adjusting movement.

5. A cutter-head embodying the construction defined by claim 1, in which the first named formations are of arcuate tongue-and-groove form and bear a slight degree of eccentricity relatively to the axis of the head.

6. A cutter-head embodying the construction defined by claim 1, and springs carried by the head and arranged to maintain the blades against their respective stops while the clamping members are being set up to clamp the blades.

7. A cutter-head embodying the construction defined by claim 1, and a member carried by the head and arranged to be adjusted rotatively about the axis of the head, and springs carried by said member and arranged to force the blades toward and against their respective stops.

8. A blade-supporting member embodying the construction defined by claim 1 and characterized by the fact that the stops are disposed so that they may be formed in gangs by a forming tool operating on a plurality of clamping members in gang relation.

9. A rotary cutter-head comprising a series of shaving blades each having parallel arcuate side edges, and a pair of members for holding the blades by said edges, said members having portions arranged to guide said edges in paths eccentric to the axis of the head so that the blades may be adjusted longitudinally of said edges, portions of said clamping members being arranged to limit the forward adjusting movement of the blades at positions where the cutting edges of the blades will be equidistant from said axis.

10. A rotary cutter-head comprising a series of shaving blades each having parallel side edges, and means for carrying the blades by their side edges, said means having portions arranged to guide the blades so that the latter may be adjusted lengthwise of said edges to equalize the distance from the axis of the head to the shaving edges of the blades, said means also having portions arranged to limit the forward adjusting movement of the blades at positions where the shaving edges will be equidistant from said axis.

11. A rotary cutter-head comprising two co-operative clamping members, a plurality of detachable cutting blades arranged to be clamped edgewise by and between said clamping members, said blades and clamping members having co-operative tongue-and-groove blade-retaining portions arranged to permit the blades to be adjusted edgewise, each of the blades having a beveled face forming its cutting edge, one of said clamping members having abutments arranged to engage said beveled faces to limit the advancement of the blades relatively to the clamping members, and means arranged to cause said clamping members to clamp the blades as specified.

12. A rotary cutter-head comprising two co-operative clamping members having eccentric arcuate guiding portions on their confronting faces, a plurality of detachable arcuate cutting blades arranged between said clamping members and having portions fitting said guiding portions of the clamping members, said portions of the blades and of the clamping members embodying co-operative tongue-and-groove formations to retain the blades and to guide them edgewise for adjustment, each of said blades having a beveled face on its inner side, with reference to its curvature, forming a transverse cutting edge, one of said clamping members having abutments arranged to engage said beveled faces to limit the advancement of the blades relatively to the clamping members, and means arranged to cause the clamping members to clamp the blades edgewise.

13. A rotary cutter-head comprising two co-operative blade-holding members constructed and arranged to clamp a circular series of blades, a series of cutting blades arranged to be clamped by said members, said members and each of said blades having co-operative tongue-and-groove formations to guide the blades for relative edgewise movement so that the blades may be adjusted to balance the cutter-head, stops carried by one of said clamping members to determine the balancing positions of the blades, and means for forcing one of said clamping members toward the other to clamp the blades.

In testimony whereof I have signed my name to this specification.

ALFRED B. FOWLER.